United States Patent [19]
Zakharov

[11] Patent Number: 5,820,130
[45] Date of Patent: Oct. 13, 1998

[54] MECHANICAL SEAL FOR MOVABLE JOINTS OF MACHINES

[76] Inventor: Boris Semenovich Zakharov, Russian Federation, 117513, Moscow, Leninsky pr., d.125, korp2, kv.304, Moscow, Russian Federation

[21] Appl. No.: 632,432

[22] PCT Filed: Feb. 16, 1994

[86] PCT No.: PCT/RU94/00027

§ 371 Date: Apr. 24, 1996

§ 102(e) Date: Apr. 24, 1996

[87] PCT Pub. No.: WO95/12080

PCT Pub. Date: May 4, 1995

[30] Foreign Application Priority Data

Oct. 25, 1993 [RU] Russian Federation ............. 93048995

[51] Int. Cl.$^6$ .................................................. F16J 15/38
[52] U.S. Cl. ......................... 277/337; 277/361; 277/375; 277/511; 277/589
[58] Field of Search .................... 277/361, 375, 277/337, 370, 511, 589

[56] References Cited

U.S. PATENT DOCUMENTS

| | | | |
|---|---|---|---|
| 1,560,307 | 11/1925 | Peeler | 277/174 |
| 2,804,050 | 8/1957 | Spilling | 277/174 |
| 2,863,632 | 12/1958 | Miller | 253/39 |
| 3,442,518 | 5/1969 | Henshaw | 277/203 |
| 4,292,014 | 9/1981 | Lupke et al. | 277/203 |
| 4,702,671 | 10/1987 | Brinkman et al. | 415/134 |
| 5,037,115 | 8/1991 | Brandon | 277/26 |
| 5,433,453 | 7/1995 | Dalton | 277/215 |

FOREIGN PATENT DOCUMENTS

| | | | |
|---|---|---|---|
| 677 | 2/1926 | Australia | 277/174 |
| 610451 | 9/1926 | France | 277/174 |
| 1553550 | 1/1969 | France | 277/165 |
| 264867 | 7/1970 | Russian Federation . | |
| 391315 | 4/1971 | Russian Federation . | |
| 401848 | 1/1974 | Russian Federation . | |
| 1488642 A1 | 6/1989 | Russian Federation . | |
| 1820111 | 6/1993 | Russian Federation | 277/174 |
| 2005935 | 1/1994 | Russian Federation | 277/53 |
| 1588965 | 8/1990 | U.S.S.R. | 277/203 |
| 1724977 | 4/1992 | U.S.S.R. | 277/203 |
| 1820111 | 6/1993 | U.S.S.R. | 277/174 |

Primary Examiner—Randolph A. Reese
Assistant Examiner—John L. Beres
Attorney, Agent, or Firm—Hardaway Law Firm P.A.

[57] ABSTRACT

The mechanical seal for movable joints of machines comprises at least two pairs of nonelastomer cylindrical rings (4, 5, 16) ground to each other with their faces and having their outer surfaces eccentrically displaced, and the rings themselves cooperate with an elastomer element (3, 15). One of the surfaces of the elastomer element (3, 15) (an outer or an inner one, respectively), has eccentrically arranged shoulders (17, 18, 19, 20) or borings (6, 7). The seal rings (4, 5, 16) have concentric cylindrical surfaces and are fitted on the shoulders (17,18,19,20) or in the borings (6,7).

5 Claims, 2 Drawing Sheets

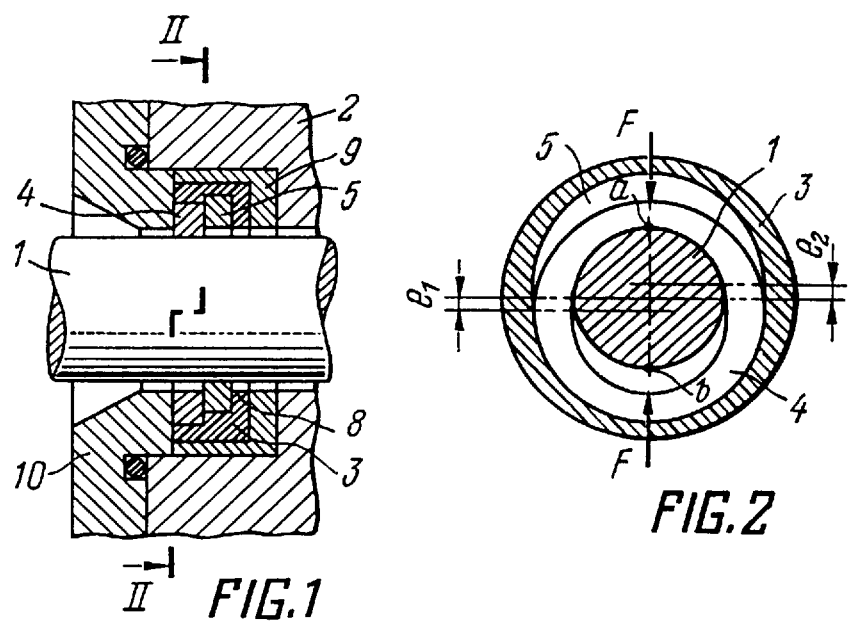
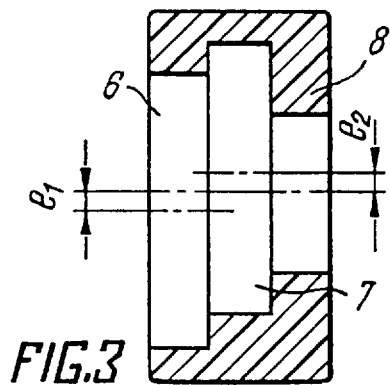

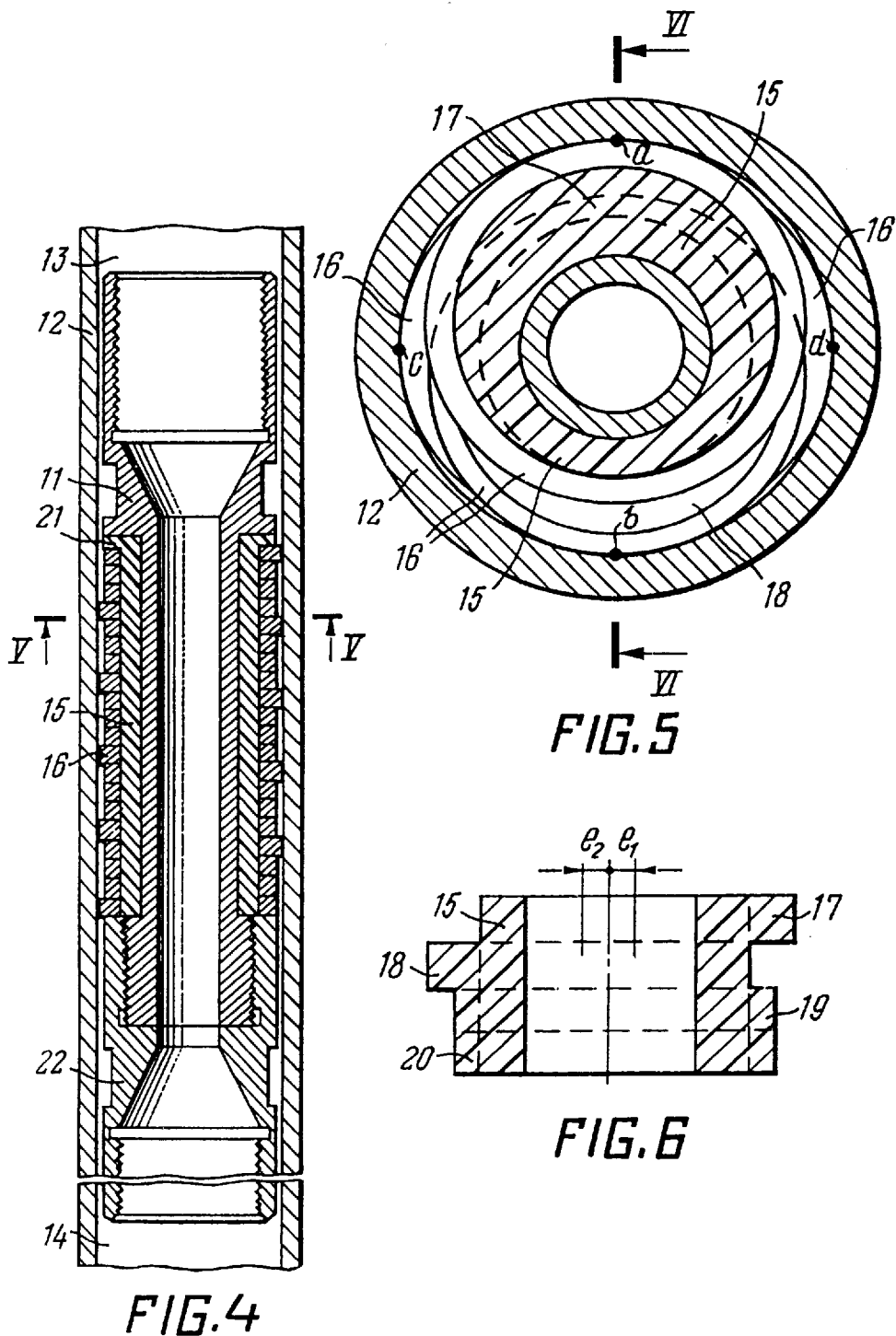

MECHANICAL SEAL FOR MOVABLE JOINTS OF MACHINES

TECHNICAL FIELD

The present invention relates to sealing devices, more specifically, to mechanical seals for movable joints of machines operating under an excess pressure.

BACKGROUND ART

It is common and widespread knowledge that reliable operation of movable joints in mechanisms performing rotary and/or reciprocating motion under an excess pressure requires higher pressure-tightness and working durability of such joints. This is attainable by providing a movable machine component with elastomer packing rings, e.g., rubber ones. However, such seals are liable to rapidly wear when operating in abrasive media and in those which dissolve elastomers. Moreover, elastomer seals function poorly at high differential pressures and high sliding speeds. All this restricts the field of their application.

More reliable are mechanical seals which comprise cylindrical rings made of an antifriction material. Such rings are lapped to each other and pressed against a shaft or a rod from the opposite directions; they are made of a nonelastomer material and have an eccentric hole. The rings are arranged in pairs so that the point on one ring most removed from its axis is opposite to the respective point on the other ring, and each pair of the rings is turned with respect to the preceding pair. The rings cooperate with an element of an elastomer material and can be positioned on, e.g., such an element (SU, A, 391,315).

However, in such seals one cannot determine the amount of angular displacement of one pair of rings with respect to the other pair, with the result that the fluid under a higher pressure finds its way to the zone of a lower pressure, which affects adversely both the pressure-tightness and the reliability of the seal.

DISCLOSURE OF THE INVENTION

It is a principal object of the invention to provide a mechanical seal that allows of reducing clearances in the movable joints of mechanisms in machines operating under an excess pressure, which in turn decreases the leaks of the working fluid and extends the seal service life.

The foregoing object is accomplished due to the fact that in a mechanical seal for movable joints of machines operating under an excess pressure, comprising at least two pairs of nonelastomer cylindrical rings ground to each other with their faces and having the outer surfaces eccentrically displaced, said rings themselves cooperating with an elastomer element and being turned in pairs with respect to each other, according to the invention, one of the surfaces of the elastomer element, an outer or an inner one, respectively, has eccentrically arranged shoulders or borings, while the seal rings have concentric cylindrical surfaces and are fitted on said shoulders or in said borings.

It is expedient that said shoulders or borings of said element be arranged in pairs and their axes be located on the opposite sides of the axis of said element, while the planes passing through the axes of the paired shoulders or borings be turned with respect to each other through an angle equal to 180/n, where n is the number of pairs of the shoulders or borings.

Such a construction arrangement of the proposed seal enables one to establish an intricately shaped labyrinth-type sealing gap or groove, whereby a high hydraulic resistance is offered to the fluid flow from a high-pressure space to a low-pressure space. A higher hydraulic resistance is also favored by a many-times' repeated change in the direction of the fluid flow through the sealing gap.

All this as a whole reduces the fluid leaks and adds to the seal service life.

BRIEF DESCRIPTION OF THE DRAWINGS

In what follows the present invention is illustrated in a detailed description of some specific exemplary embodiments thereof with reference to the accompanying drawings, wherein:

FIG. 1 a longitudinal sectional view of a mechanical seal for a movable joint of a mechanism having a horizontal axis of rotation, according to the invention;

FIG. 2 is a section taken along the line II—II in FIG.1;

FIG. 3 is a view of an elastomer element provided with two eccentric borings;

FIG. 4 is a longitudinal sectional view of a mechanical seal for a movable joint of a mechanism having a vertical axis of rotation, according to the invention;

FIG. 5 is a section taken along the line V—V in FIG. 4; and

FIG. 6 shows an elastomer element having two pairs of eccentric shoulders.

DESCRIPTION OF THE PREFERRED EMBODIMENT

Considered below are two embodiments of the proposed mechanical seal for movable joints of mechanisms having a horizontal and a vertical axis of rotation, respectively.

FIGS. 1–3 illustrate a mechanical seal of a shaft 1 or a rod having a horizontal axis of rotation and fitted in, e.g., the gland box of a housing 2 of a machine operating at an excess pressure. The seal comprises an elastic member appearing as a holder 3 of an elastomer material, and cylindrical seal rings 4, 5 of a nonelastomer material. The inner surface of the holder 3 has eccentrically arranged borings 6, 7 whose axes are offset with respect to the axis of the shaft 1 by the amounts $e_1$ and $e_2$ of eccentricity and are arranged symmetrically on both sides of the shaft axis, that is, they are turned through 180 degrees with respect to each other. A supporting shoulder 8 is provided in the elastic holder 3 on the side of a higher fluid pressure. The seal rings 4, 5 are fitted in the borings 6, 7 with a small diametric and axial interference (negative allowance), which are established due to the ratio between the diametric and axial dimensions of a metal holder 9 and of a flange 10.

When fitting the proposed seal on the shaft 1 or the rod the seal rings 4, 5 get in contact with the shaft 1 at opposite points "a" and "b", this being due to an eccentric arrangement of said rings with respect to the axis of the shaft or rod.

It is due to elasticity of the holder 3 that each of the seal rings acts upon the movable joint of the mechanism with a force F.

FIGS. 4–6 illustrate the mechanical seal of a plunger 11 of an oil-well sucker-rod pump having a vertical axis of rotation. The plunger 11 is housed in a cylinder 12 and separates a high-pressure chamber 13 of the pump from a low-pressure chamber 14 thereof. The proposed mechanical seal is fitted on the cylindrical surface, which comprises an elastic member shaped as a holder 15 of an elastomer, and a set of seal rings 16 made of rigid nonelastomer materials.

The rings 16 interact with the holder 15 and with the inner surface of the cylinder 12. The holder 15 has on its outer surface eccentrically arranged shoulders 17, 18, 19, and 20 which are arranged in pairs, and in each pair of the shoulders the axes of the latter are arranged symmetrically on the opposite sides of the axis of the holder 15, that is, they are turned through 180 degrees with respect to each other. Depending on the number of the seal rings each pair of the shoulders is turned at a definite angle so as to prevent the fluid against passing from the higher-pressure chamber to the lower-pressure one.

It is obvious that in the case of a single pair of the seal rings of the seal, their turn through 180 degrees is an optimum one. For two pairs of the seal rings the planes, wherein the axis of the eccentrically arranged shoulders lie are to be turned through 90 degrees. Accordingly, for three pairs of seal rings said angle equals 60 degrees, and for four pairs, 45 degrees, and so on. Thus, in the general case, the angle of turn of the planes passing through the axes of the paired shoulders or borings, can be found from an expression 180/n, where n is the number of pairs of shoulders or borings.

The elastic holder 15 has a shoulder 21 located on the side of the higher-pressure zone. A set of the seal rings 16 held-down by an adapter 22 adjoins the shoulder 21. The concentric seal rings 16 fitted on the eccentrically arranged shoulders 17, 18, 19, and 20 get in contacts with the surface of the cylinder 12 at the points "a", "b", "c", and "d" which are spaced apart equidistantly along the periphery of said cylinder. Thus, the more pairs of rings are set on the plunger 11 the greater differential pressure at which said plunger can operate.

The mechanical seal operates as follows.

When the proposed mechanical seal is enclosed in the housing of a machine operating under an excess pressure, or in a cylinder, the seal rings 16 are pressed against the surface being sealed of a movable joint of a mechanism in those places where the ring together with the shoulder has the maximum width. In the places where the rings are pressed against the surface being sealed the sealing gap equals zero. Accordingly, the sealing gap is maximum on the side opposite to the point of the ring contact with the surface being sealed. However, since the holder has eccentrically arranged shoulders or borings, and the seal rings are tightly forced against each other at the ends and are appropriately turned in pairs with respect to each other, an intricately shaped labyrinth gap is defined between the surface being sealed and the set of seal rings, and hence there is offered a great hydraulic resistance to the fluid flow from the higher-pressure space 13 to the lower-pressure space 14. It is noteworthy that the value of hydraulic resistance is liable to rise in the course of repeated changes in the direction of the fluid flow through the sealing gap. As the rubbing surfaces of the seal rings and the surface being sealed of the movable joint of the mechanism get gradually worn in, the amount of the sealing gap gradually decreases during the seal service life so that the labyrinth gap seal becomes virtually a contact one, the degree of pressure-tightness of which is much higher than that of the gap seal. In such a case the wear of the material the joint is made from is compensated for by the elastic elastomer holder 15 or 3. Thus, a higher pressure-tightness of the seal and a simultaneous extension of its service life are attained. A still more effect can be obtained from practical application of the proposed seal when using the seal rings 4, 5, and 16 made from a wear-resistant material having a rough surface which can be coated with an antifriction layer appearing as, e.g., composite materials, which is due to more rapid wearing-in of the rubbing surfaces.

Industrial Applicability

The invention is applicable to good advantage in mechanical engineering for sealing movable joints of mechanisms in machines operating under an excess pressure, namely, pumps, compressors, agitators, hydraulic- and air-operated devices, and so on.

I claim:

1. A mechanical seal for moveable joints of machines operating under excess pressure, said seal having a longitudinal axis and comprising:

at least two pairs of non-elastomeric cylindrical seal rings (4, 5, 16) ground to each other on their faces, each ring having an outside surface eccentrically displaced from said outside surfaces of the other of said rings and an inner surface concentrically arranged with said outside surface of said ring, wherein each pair of said at least two pairs of rings is positioned relative to said longitudinal axis of said seal differently than the other pairs of said at least two pairs of rings; and an elastomeric element (3, 15) cooperating with said rings and having a plurality of eccentrically arranged cylindrical surfaces, characterized in that each one of the cylindrical surfaces of the elastomeric element (3, 15) is fitted with a respective seal ring (4, 5, 16).

2. The mechanical seal as set forth in claim 1, characterized in that the eccentrically arranged portions (17, 18, 19, 20) of the elastomeric element (3, 15) are in fact shoulders.

3. The mechanical seal as set forth in claim 1, characterized in that the eccentrically arranged portions (6, 7) of the elastomeric element (3, 15) are in fact borings.

4. The mechanical seal as set forth in claim 2, characterized in that said shoulders (17, 18, 19, 20) of the elastomeric element (3, 15) are arranged in at least two pairs, each shoulder in a pair of shoulders is located on a side of the longitudinal axis of said seal opposite the other shoulder of said pair of shoulders, and wherein a pair of shoulders (17, 18, 19, 20) is positioned relative to said longitudinal axis of said seal at an angle of approximately 180/n degrees from another pair of said at least two pairs of shoulders, where n is the number of pairs of the shoulders (17, 18, 19, 20).

5. The mechanical seal as set forth in claim 3, characterized in that said borings (6, 7) of the elastomeric element (3, 15) are arranged in at least two pairs, each boring in a pair of borings is located on a side of the longitudinal axis of said seal opposite the other boring of said pair of borings, and wherein a pair of borings (6, 7) is positioned relative to said longitudinal axis of said seal at an angle of approximately 180/n degrees from another pair of said at least two pairs of borings, where n is the number of pairs of the borings (6, 7).

* * * * *